United States Patent [19]
Grace

[11] 4,057,265
[45] Nov. 8, 1977

[54] TOWING APPARATUS
[76] Inventor: Bud W. Grace, 31480 Myrna, Livonia, Mich. 48154
[21] Appl. No.: 744,638
[22] Filed: Nov. 24, 1976
[51] Int. Cl.² ............................................. B60D 1/18
[52] U.S. Cl. .................................. 280/468; 280/490 R
[58] Field of Search ................... 280/456 R, 462, 467, 280/468, 470, 490 R

[56] References Cited
U.S. PATENT DOCUMENTS

| 1,432,066 | 8/1922 | Housser | 280/468 |
| 4,000,911 | 1/1977 | Weber | 280/490 R |

Primary Examiner—Joseph F. Peters, Jr.
Assistant Examiner—R. Schrecengost
Attorney, Agent, or Firm—Charles W. Chandler

[57] ABSTRACT

A towing apparatus useful for moving mobile homes includes a vehicle having a frame movable to adjusted positions along a linear path of motion parallel to the longitudinal axis of the vehicle, a support mounted on the frame so as to be movable to an adjusted vertical position and a hitching ball mounted on the support so as to be movable in lateral direction with respect to the vehicle to an adjusted position.

9 Claims, 7 Drawing Figures

4,057,265

TOWING APPARATUS

BACKGROUND OF THE INVENTION

This invention is related to apparatus for towing mobile homes and more particularly to a truck-mounted apparatus having a hitching ball that is movable in six directions to adjusted positions along three mutually perpendicular and linear paths of motion.

Mobile homes manufactured in recent years have become increasingly longer and wider. Many such homes are parked in a permanent location. However, their size and length makes movement into a confined area difficult with conventional towing vehicles. For example, in a typical mobile home park, the home must be maneuvered onto a cement pad so as to clear various obstacles such as trees and utility supports with close clearances. The conventional mobile home has a standard coupling which engages a ball carried by the towing tractor. It is often difficult to mate the ball with the coupling without considerable maneuvering of the tractor to precisely locate the ball below the coupling.

In addition, conventional commercial towing tractors employ a ball that is carried by a pivotally mounted arm in such a manner that the ball swings in an arc as it is being raised from a lower position. Such an arc cause the mobile home to move horizontally a sufficient distance to strike obstacles such as trees and the like as the mobile home frame is being raised. Still another problem with conventional towing apparatus is that in order to maneuver the mobile home into a close fitting location, the tractor itself must often be removed into a position from which it is difficult to remove the tractor.

SUMMARY OF THE INVENTION

The broad purpose of the present invention is to provide a towing apparatus for moving mobile homes in which the hitching ball is movable in six directions of motion to make it relatively easy to engage and disengage the ball from the coupling on the mobile home. The ball is mounted on a frame so as to be movable along a linear path of motion in a forward and rearward direction with respect to the tractor, along a second path of motion and in a lateral direction with respect to the tractor and also in a vertical path of motion. Three control levers are mounted at the rear of the tractor which allows the user to quickly and precisely engage the ball with the coupling on the mobile home with a minimum amount of tractor maneuvering. Preferably, hydraulic actuated cylinders are associated with each direction of motion to reduce the amount of manual effort to a minimum.

In the preferred embodiment of the invention, the towing apparatus is constructed in such a manner that the support on which the ball is mounted can be lowered to engage the ground. Further downward motion of the support raises the rear wheels of the tractor above the ground. The user can then move the rear of the tractor either sideways or forward which is useful for removing the tractor from a position in which its rear wheels may be stuck or in which the tractor itself requires a sideways motion to relocate it.

The lateral motion of the ball is particularly useful when the operator in the tractor cab has difficulty viewing the rear end of the mobile home which is often several feet wider than the tractor. Further objects and advantages of the invention will become apparent to those skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
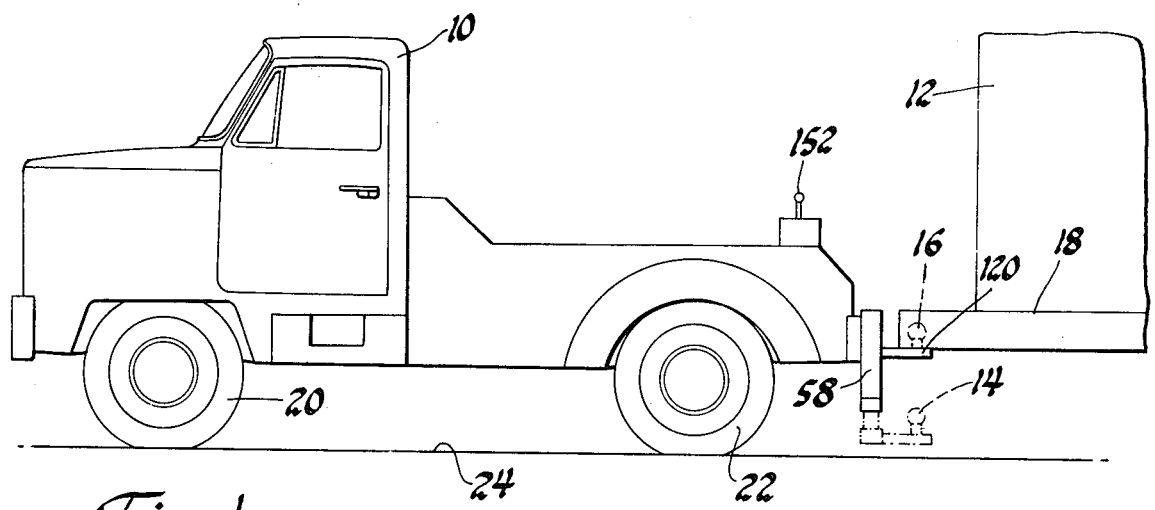
FIG. 1 is a view of a preferred towing apparatus connected to a mobile home.

Now referring to the drawings, a preferred towing apparatus comprises a tractor 10, illustrated as being connected to a mobile home 12 by means of a hitching ball 14 engaged with a coupling 16 carried by frame 18 of the mobile home.

Tractor 10 has forward wheel means 20 and rearward wheel means 22 for engaging ground 24.

Figure 4:
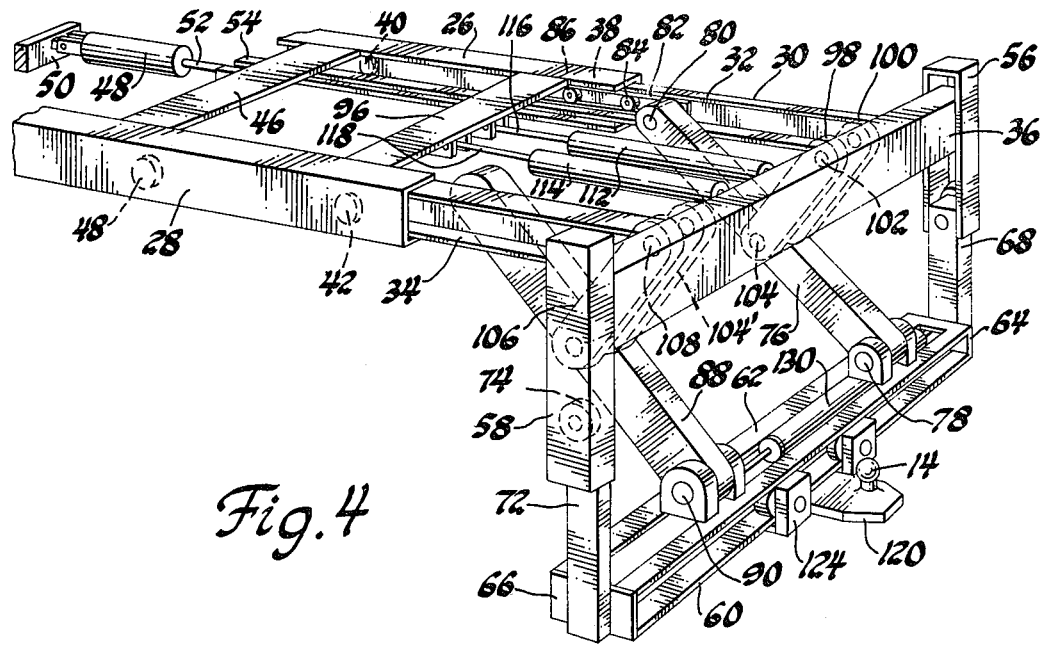
FIG. 4 is a perspective fragmentary view of the towing apparatus.

Referring to FIG. 4, the body of tractor 10 has a pair of spaced parallel channels 26 and 28 supported in a horizontal position parallel to the longitudinal axis of the tractor. A hitching frame 30 is mounted on channels 26 and 28 so as to be movable in either forward or a rearward direction with respect to tractor 10. Frame 30 comprises a pair of parallel I beams 32 and 34 joined at their rearward ends by a support 36. Beam 32 is received within the sidewalls of channel 26 and rides on a pair of roller means 48 and 40 (illustrated in phantom) carried in channel 28.

A plate 46 is connected to the forward ends of beams 32 and 34. Hydraulic cylinder 48 is connected to body 50 of tractor 10 and has a piston 52 connected by means 54 to plate 46 to provide power means for moving frame 30 in either a forward direction or a rearward direction with respect to tractor 10.

A tubular guide 56 is mounted in a vertical position on one end of support 36 and a second tubular guide 58 is mounted in a vertical position at the opposite end of support 36. Guides 56 and 58 are parallel to one another and have open lower ends as illustrated in FIG. 4.

A pair of elongated supports 60 and 62 having their opposite ends connected by plates 64 and 66, respectively, are mounted below and parallel to support 36. An arm 68 has its lower end connected to plate 64. Roller means 70 are carried at the upper end of arm 68 and disposed within guide 56. Similarly, a second arm 72 has its lower end connected to plate 66 so as to be supported in a vertical position. Roller means 74 (illustrated in phantom) are carried at the upper end of arm 72 and disposed within vertical guide 58 so that the two arms 68 and 72 cooperate with their respective roller means to guide supports 60 and 62 for vertical motion.

Figure 5:
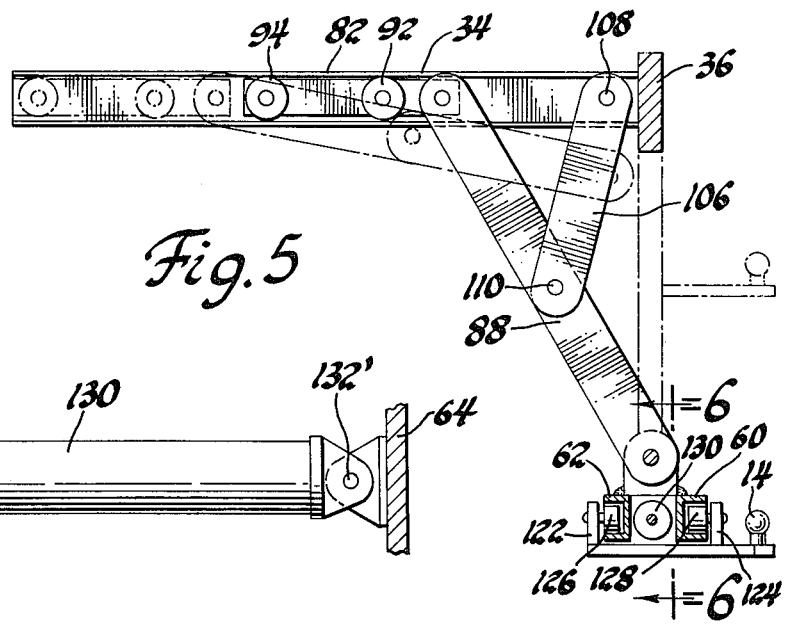
FIG. 5 is a side view of the lever arrangement for raising and lowering the hitching ball.

A link 76 has its lower end connected by pivot means 78 to supports 60 and 62, and has its upper end connected by pivot means 80 to a frame 82. Frame 82 carries a pair of roller means 84 and 86 that roll on the inner side of beam 32 so that the upper end of link 76 is movable in a horizontal direction. Similarly, a second link 88 is connected by pivot means 90 to supports 60 and 62. As best shown in FIG. 5, the upper end of link 88 is pivotally connected to frame 82 which has a pair of roller means 92 and 94 which roll along the inner side of beam 34.

Referring to FIG. 4, a transverse support 96 connects the opposite sides of frame 82 together so that links 76 and 88 cooperate so that as the upper ends of the links are moved in the forward direction, their lower ends raise supports 60 and 62 upwardly. Similarly, as the upper ends of links 76 and 88 are moved in the rearward direction, their lower ends cooperate in lowering supports 60 and 62 downwardly.

A second pair of links 98 and 100 have their upper ends pivotally connected by means 102 to support 36 and their lower ends connected by pivotal means 104 to the mid-section of link 76 to cooperate with the lower end of link 76 in moving supports 60 and 62 in a vertical path of motion. Similarly, a pair of short links 104' and 106 have their upper ends connected by pivotal means 108 to support 36 and their lower ends connected by pivotal means 110 to the mid-section of link 88 to cooperate with link 88 in moving supports 60 and 62 in a vertical motion.

A pair of hydraulic cylinders 112 and 114 are each connected to support 36 and have reciprocating pistons 116 and 118 connected to support 96 to provide means for moving frame 82 in a horizontal direction thereby raising and lowering supports 60 and 62 in their vertical motion.

Figure 6:
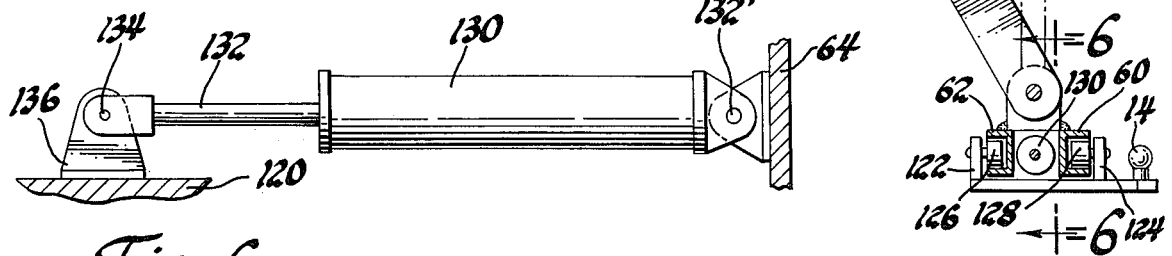
FIG. 6 is an enlarged view taken along line 6—6 of FIG. 5.

Referring to FIGS. 5 and 6, ball 14 is mounted on a plate 120. A pair of spaced support means 122 and 124 are mounted on plate 102. Roller means 126 and 128 are carried by support means 122 and 124, respectively, to support plate 120 for lateral motion along supports 60 and 62.

Referring to FIGS. 4 and 6, a hydraulic cylinder 130 is mounted between supports 60 and 62. One end of cylinder 130 is connected by means 132' to plate 64. Cylinder 130 has a piston rod 132 connected by means 134 to support 136 so as to be operative to move ball 14 parallel to supports 60 and 62. The distance between the extreme positions of ball 14 can be increased by connecting a pulley arrangement to piston 130 in a manner well known to those skilled in the art.

Figure 7:
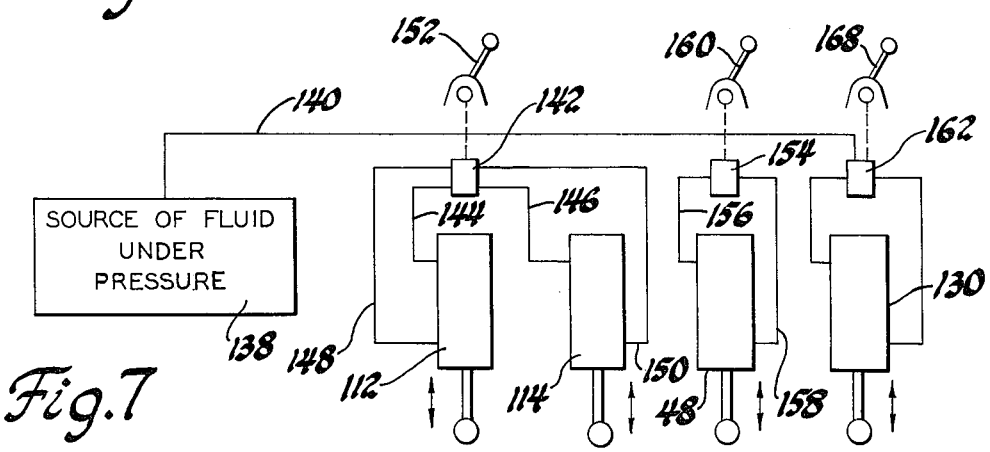
FIG. 7 is a schematic illustration of the power system.

The means for operating power means 112 and 114 is illustrated in FIG. 7 and includes a source of hydraulic fluid under pressure 138 connected by conduit means 140 to a valve 142 having conduit means 144 and 146 to one end of cylinders 112 and 114, and conduits 148 and 150 to the opposite end of these power cylinders. An operator 152 is mounted on the rear of the tractor 10 to permit the user to move control valve 142 in one direction to extend the pistons of the cylinders 112 and 114 to adjusted positions. Movement of operator 152 in the opposite direction cause the positions of cylinders 112 and 114 to be moved in the opposite direction to precise adjusted positions.

Conduit 140 is also connected to control valve 154 which controls fluid pressure through conduit means 156 and 158 to opposite ends of power cylinder 48 so that the user by controlling the position of an operator 160 can move the piston rod of cylinder 48 to a precise adjusted position. Similarly, a valve 162 controls fluid pressure from conduit 140 to conduits 164 and 166 connected to opposite ends of power cylinder 130 so that the user by positioning operator 168 can extend or retract piston rod 132 to a precise adjusted position.

By manipulating operators 152 and 160 and 168, the user can move ball 14 in three mutually perpendicular directions. It is apparent that operators 152 and 160 and 168 can be connected to appropriate remote control operators mounted in the cab of tractor 10 so that the user can position ball 14 without leaving the cab. Normally, the user operates the three operators while standing adjacent the tractor rear to have a clear line of vision between ball 14 and coupling 16 on the frame of the mobile home.

Figure 3:
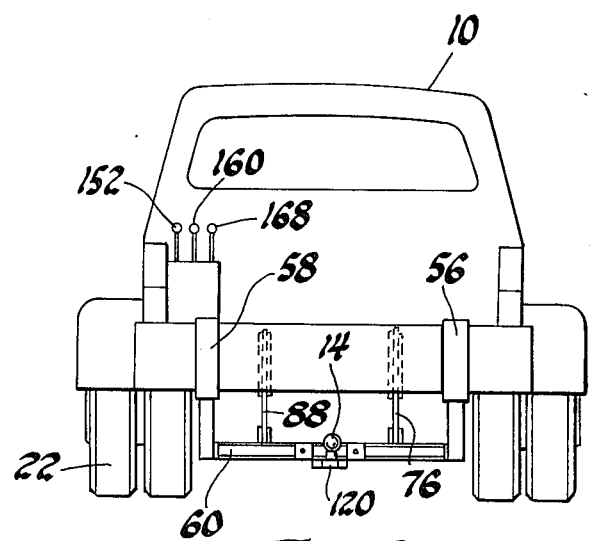
FIG. 3 is a rear view of the preferred towing apparatus.

Referring to FIG. 1, the user can position ball 14 directly beneath coupling 16 by moving frame 30 from the rear of the tractor toward the mobile home and then toward an appropriate lateral position, as illustrated in FIG. 3 thereby obviating the necessity for precise sidewise maneuvering of tractor 10. The user then raises ball 14 to mate with coupling 16. When the mobile home has been relocated the user lowers ball 14 to release it from coupling 16.

Figure 2:
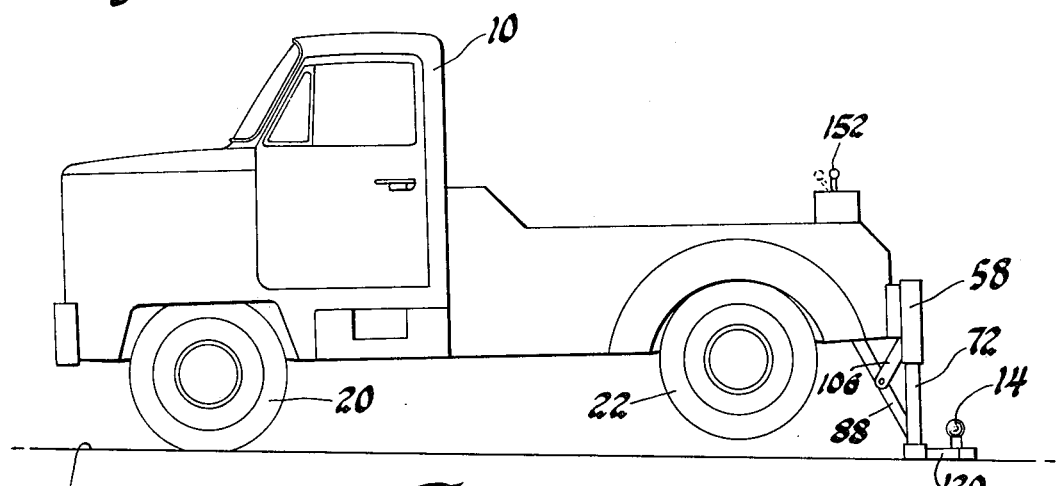
FIG. 2 is a view of the preferred towing apparatus used for raising the rear wheels of the tractor above the ground.

Referring to FIG. 2, by lowering supports 60 and 62 until they engage the ground, the user can then raise the rear wheels of tractor 10 above ground 24. Then by operating power means 130, the user can move the rear of the tractor in a sidewise motion. Similarly, when ball 14 is above the ground, the user can carefully position mobile home 13 in a sidewise direction to an adjusted position.

Although the preferred embodiment illustrated is operated by hydraulic power means, other forms of power can be employed as electric power, pneumatic power and the like.

Having described my invention, I claim:

1. A combination comprising:
    a towing vehicle having a frame, forward wheels and rear wheels mounted on said frame, said wheel means being adapted to engage the ground;
    a hitching frame mounted on the vehicle so as to be movable from a forward position toward a rearward position with respect to the vehicle along a first path of motion, and first power means connected to the hitching frame for moving it along said first path of motion;
    a support member carried on the hitching frame so as to be movable from a lower position toward an upper position along a linear, generally vertical path of motion, and second power means for moving the support member along said vertical path of motion, independently of the motion of the hitching frame along said first path of motion, the second power means being operative to engage the support member with the ground to raise the rear wheel means above the ground when the forward wheel means are engaged therewith; and
    a hitching ball suited for coupling to a second vehicle to be towed by said towing vehicle and means mounting the hitching ball on the support member for motion therewith.

2. A combination as defined in claim 1, including third power means being operative to move the vehicle in a lateral direction at such times as the rear wheels of the vehicle are raised above the ground.

3. A combination as defined in claim 1, in which the first power means is operative to move the towing vehicle in a forward direction with respect to the ball when the ball is engaged with the ground and the rear wheel means are raised above the ground.

4. A combination as defined in claim 1, in which the first power means is operative to move the towing vehicle in either a forward direction away from the ball or in a rearward direction toward the ball when the ball is engaged with the ground and the rear wheel means are raised above the ground.

5. A combination as defined in claim 1, including an elongated link having one end connected to the second power means for movement therewith, the opposite end of the link being pivotally connected to the support to raise the support according to the motion of the second power means.

6. A combination as defined in claim 5, including a connecting member connected to the second power means for substantially horizontal motion therewith, said connecting member being connected to the link to move the support in a generally vertical motion as said connecting member is being moved in a horizontal motion.

7. A combination comprising:
a towing vehicle;
a hitching frame mounted on said towing vehicle so as to be movable from a forward position toward a rearward position with respect to the vehicle along a first path of motion, and first power means connected to the hitching frame for moving it along said first path of motion;
guide means mounted on the hitching frame;
a support member connected to the guide means for vertical motion therealong from a lower position toward an upper position, and second power means for moving the support member along said vertical path of motion, independently of the motion of the hitching frame along said first path of motion;
an elongated link having one end pivotally connected to the support as the opposite end of the link is being moved by the second power means; and
a hitching ball suited for coupling to a second vehicle to be towed by said towing vehicle, and means mounting the hitching ball on the support member for motion therewith.

8. A combination as defined in claim 7, including a second support member carried by the hitching frame for motion therewith, the second support member being movable to an adjusted position along a second, horizontal path of motion at right angles to said first path of motion, the hitching ball being connected on said second support member for motion therewith.

9. A combination as defined in claim 7, in which the vehicle has forward wheel means and rear wheel means, said wheel means being adapted to engage the ground, and the second power means is operative to engage the support member with the ground to raise the rear wheel means above the ground when the forward wheel means are engaged therewith.

* * * * *